United States Patent
Askan

(10) Patent No.: US 10,707,029 B2
(45) Date of Patent: Jul. 7, 2020

(54) LOW-VOLTAGE CIRCUIT BREAKER DEVICE

(71) Applicant: EATON INTELLIGENT POWER LIMITED, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/342,547

(22) PCT Filed: Sep. 29, 2017

(86) PCT No.: PCT/EP2017/074914
§ 371 (c)(1),
(2) Date: May 14, 2019

(87) PCT Pub. No.: WO2018/072984
PCT Pub. Date: Apr. 26, 2018

(65) Prior Publication Data
US 2019/0279829 A1     Sep. 12, 2019

(30) Foreign Application Priority Data
Oct. 21, 2016   (DE) .................. 10 2016 120 071

(51) Int. Cl.
*H01H 9/54* (2006.01)
*H02H 3/02* (2006.01)
(Continued)

(52) U.S. Cl.
CPC ............ *H01H 9/542* (2013.01); *H02H 3/021* (2013.01); *H02H 3/025* (2013.01); *H02H 3/08* (2013.01);
(Continued)

(58) Field of Classification Search
CPC ........ H01H 9/542; H02H 3/021; H02H 3/025; H02H 3/08; H02H 7/222
See application file for complete search history.

(56) References Cited

U.S. PATENT DOCUMENTS 4,420,784 A * 12/1983 Chen ....................... H01H 9/30
361/13
9,673,804 B2   6/2017 Hübbers et al.
(Continued)

FOREIGN PATENT DOCUMENTS

AT           515440 A1    9/2015
DE    102010000082 A1    7/2011
(Continued)

*Primary Examiner* — Scott Bauer
(74) *Attorney, Agent, or Firm* — Leydig, Voit & Mayer, Ltd.

(57) ABSTRACT

A low-voltage circuit breaker device includes: at least one outer conductor path from an outer conductor supply terminal of the low-voltage circuit breaker device to an outer conductor load terminal of the low-voltage circuit breaker device; a neutral conductor path from a neutral conductor terminal of the low-voltage circuit breaker device to a neutral conductor load terminal of the low-voltage circuit breaker device; a mechanical by-pass switch arranged in the outer conductor path; a semiconductor circuit arrangement of the low-voltage circuit breaker device connected in parallel to the bypass switch; an electronic control unit; and a current measurement arrangement arranged in the outer conductor path and connected to the electronic control unit. The electronic control unit actuates the mechanical by-pass switch and the first semiconductor circuit arrangement upon detection of a predefined overload current, namely a short-circuit current, by the current measurement arrangement.

20 Claims, 1 Drawing Sheet

(51) Int. Cl.
*H02H 3/08* (2006.01)
*H02H 7/22* (2006.01)
*H02H 1/00* (2006.01)

(52) U.S. Cl.
CPC ....... *H02H 7/222* (2013.01); *H01H 2009/544* (2013.01); *H02H 1/0007* (2013.01)

(56) References Cited

U.S. PATENT DOCUMENTS

| | | | | |
|---|---|---|---|---|
| 2008/0164961 | A1* | 7/2008 | Premerlani | H01H 1/0036 335/7 |
| 2012/0218676 | A1* | 8/2012 | Demetriades | H01H 9/542 361/115 |
| 2013/0056755 | A1* | 3/2013 | Hatai | H01L 23/49805 257/77 |
| 2014/0078622 | A1* | 3/2014 | Crane | H02H 3/087 361/8 |
| 2015/0214724 | A1* | 7/2015 | Skarby | H01H 9/542 361/91.5 |
| 2015/0280421 | A1* | 10/2015 | Niwa | H02H 3/38 361/91.1 |
| 2017/0011875 | A1* | 1/2017 | Dorn | H01H 9/542 |
| 2017/0236676 | A1 | 8/2017 | Bartonek | |

FOREIGN PATENT DOCUMENTS

| | | |
|---|---|---|
| DE | 102014108657 A1 | 12/2015 |
| WO | 2015028634 A1 | 3/2015 |

\* cited by examiner

LOW-VOLTAGE CIRCUIT BREAKER DEVICE

CROSS-REFERENCE TO PRIOR APPLICATIONS

This application is a U.S. National Phase application under 35 U.S.C. § 371 of International Application No. PCT/EP2017/074914, filed on Sep. 29, 2017, and claims benefit to German Patent Application No. DE 10 2016 120 071.9, filed on Oct. 21, 2016. The International Application was published in German on Apr. 26, 2018 as WO 2018/072984 under PCT Article 21(2).

FIELD

The invention relates to a low-voltage circuit breaker device.

BACKGROUND

A corresponding circuit breaker device is known to the applicant from WO 2015/028634 A1. Upon the circuit breaker device being switched off, the bypass switch is opened first, wherein an arc ensues, and the current commutates to the semi-conductor circuit arrangement. Subsequently, the previously switched-on semi-conductor circuit arrangement is switched off and the isolating contacts for providing the galvanic isolation, which isolating contacts are connected in series to the bypass switch, are opened.

In the practical implementation of this concept in actual switches, the semi-conductor circuit arrangement was constructed in a conventional manner with IGBT power modules. In this respect, it has been found to be disadvantageous that in such switching devices high loads on the contacts of the bypass switch occur when a short-circuit current is switched off. Similarly, in these switching devices, the semiconductors of the semiconductor circuit arrangement are subject to high levels of stress, which limits the service life or the number of possible switching cycles.

SUMMARY

In an embodiment, the present invention provides a low-voltage circuit breaker device, comprising: at least one outer conductor path from an outer conductor supply terminal of the low-voltage circuit breaker device to an outer conductor load terminal of the low-voltage circuit breaker device; a neutral conductor path from a neutral conductor terminal of the low-voltage circuit breaker device to a neutral conductor load terminal of the low-voltage circuit breaker device; a mechanical by-pass switch arranged in the outer conductor path; a semiconductor circuit arrangement of the low-voltage circuit breaker device connected in parallel to the bypass switch; an electronic control unit; and a current measurement arrangement arranged in the outer conductor path and connected to the electronic control unit, wherein the electronic control unit is configured to actuate the mechanical by-pass switch and the semiconductor circuit arrangement upon detection of a predefined overload current, comprising a short-circuit current, by the current measurement arrangement, wherein the semiconductor circuit arrangement comprises at least one first semiconductor component and at least one second semiconductor component, and wherein the at least one first semiconductor component is arranged on a first side of a component carrier, and the at least one second semiconductor component is arranged on a second side of the component carrier facing away from the first side.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker device of the type stated at the beginning with which the given disadvantages may be avoided, which has a compact size, which allows high nominal or continuous current, which has a high breaking capacity and is highly reliable over a long period of time.

Thus a low-voltage circuit breaker device may be created, which has a low load of the components, in particular the bypass switch and the semiconductor circuit arrangement, and has high-level reliability over a long period of time. It has been found that, in particular, the time which the short-circuit current requires to commutate to the semiconductor circuit arrangement during the opening of the bypass switch is relevant for the switching capacity. This time should be as short as possible. The speed at which the contacts of the bypass switch open and the relevant loop inductance of the low-voltage circuit breaker device are particularly relevant for this so-called commutation time. However, the loop inductance is determined by the actual structure or the distances within the actual low-voltage circuit breaker device. Known applications of such low-voltage circuit breaker devices with IGBT power modules have a structure in which the semiconductor components are arranged unilaterally on a carrier. This leads not only to long line paths and loops, along with the corresponding lengthening of the commutation time, but also to different line lengths for the circuit parts for different polarities of the applied voltage, which in turn leads to unequal conditions and behavior for the different polarities during a switching-off process. By means of the present measures, the current paths within the low-voltage circuit breaker device which are relevant to the commutation may be reduced, whereby the commutation time of the short-circuit current to the semiconductor circuit arrangement can be reduced directly, wherein identical conditions for different polarities may additionally be created. A rapid disconnection of a short circuit may thereby be achieved, wherein the respective low-voltage circuit breaker device may be executed with smaller dimensions than in the prior art. Furthermore, no compensation currents occur within the low-voltage circuit breaker device due to asymmetrical states.

Figure 1:
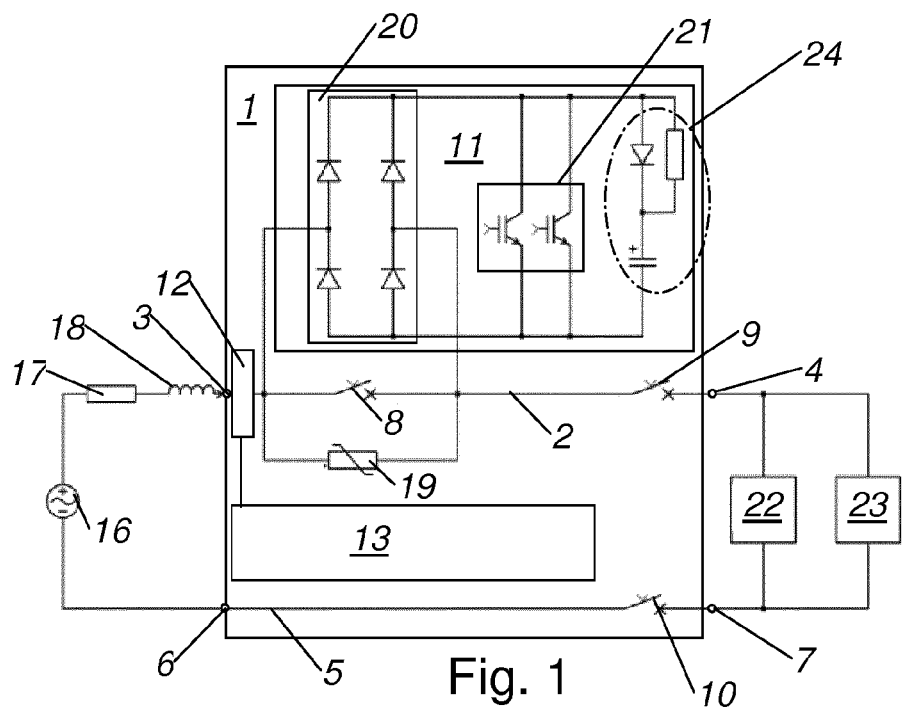
FIG. 1 shows a circuit diagram of a present circuit breaker device with a first embodiment of a semiconductor circuit arrangement.

FIG. 1 shows a wiring diagram or a circuit diagram of one embodiment of a low-voltage circuit breaker device 1 comprising at least one outer conductor path 2 from an outer conductor supply terminal 3 of the low-voltage circuit breaker device 1 to an outer conductor load terminal 4 of the low-voltage circuit breaker device 1, and a neutral conductor path 5 from a neutral conductor terminal 6 of the low-voltage circuit breaker device 1 to a neutral conductor load terminal 7 of the low-voltage circuit breaker device 1, a mechanical by-pass switch 8 being arranged in said outer conductor path 2, a semiconductor circuit arrangement 11 of the low-voltage circuit breaker device 1 being connected in parallel to the bypass switch 8, a current measurement arrangement 12 being arranged in said outer conductor path 2 and connected to an electronic control unit 13 of said circuit breaker device 1, the electronic control unit 13 being designed to actuate the by-pass switch 8 and the first semiconductor circuit arrangement 11 upon detection of a predefined overload current, in particular a short-circuit current, by means of the current measurement arrangement 12, said semiconductor circuit arrangement 11 comprising at least one first semiconductor component 63, preferably a first semiconductor component assembly 65, and said semiconductor circuit arrangement 11 comprising at least one second semiconductor component 64, preferably a second semiconductor component assembly 66. A low-voltage circuit breaker device 1 having such a schematic structure is known, for example, from WO 2015/028634 A1.

Figure 2:
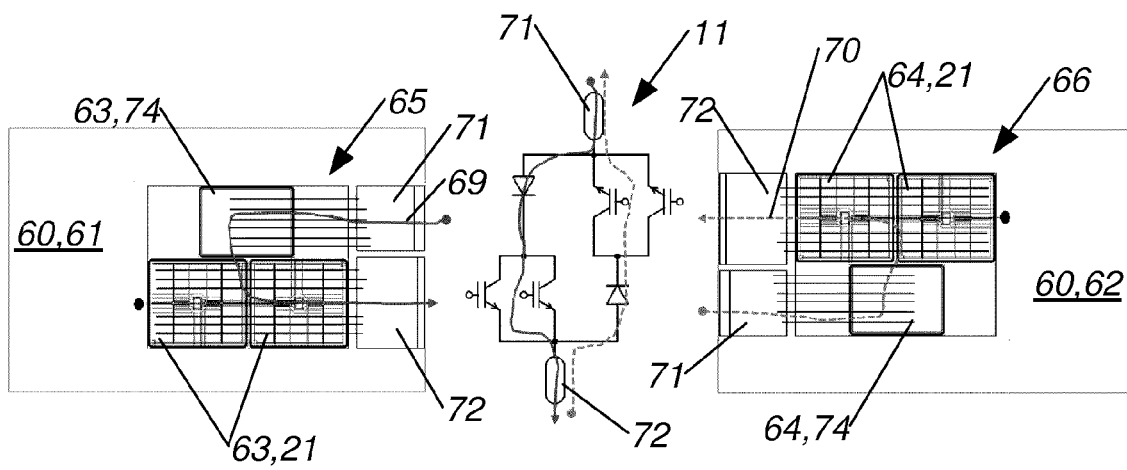
FIG. 2 shows a second embodiment of a semiconductor circuit arrangement as a circuit diagram and the two sides of a first embodiment of a component carrier with the corresponding actual semiconductor components of the semiconductor circuit arrangement.
Figure 3:
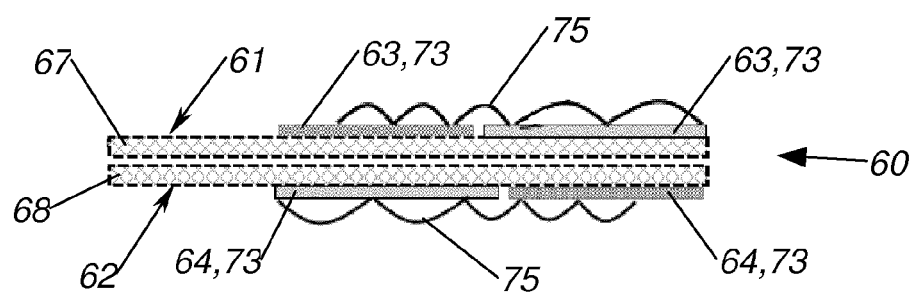
FIG. 3 shows a sectional view through a second embodiment of a component carrier having a semiconductor component in bare die technology.

FIGS. 2 and 3 show two different embodiments of a component carrier, wherein the at least one first semiconductor component 63, preferably the first semiconductor component assembly 65, is arranged on a first side 61 of the component carrier 60, and wherein the at least one second semiconductor component 64, preferably the second semiconductor component assembly 66, is arranged on a second side 62 of the component carrier 60 facing away from the first side 61.

This makes it possible to create a low-voltage circuit breaker device 1, which has a low load on the components, in particular on the bypass switch 8 and the semiconductor circuit arrangement 11, and has high-level reliability over a long period of time. It has been found that, in particular, the time which the short-circuit current requires to commutate to the semiconductor circuit arrangement 11 during the opening of the bypass switch 8 is relevant to the switching capacity. This time should be as short as possible. In particular, the speed at which the contacts of the bypass switch 8 open and the relevant loop inductance of the low-voltage circuit breaker device 1 are relevant to this so-called commutation time. However, the loop inductance is determined by the actual structure or the distances within the actual low-voltage circuit breaker device 1. Known applications of such low-voltage circuit breaker devices 1 with IGBT power modules have a structure in which the semiconductor components 63, 64 are arranged unilaterally on a carrier. This leads not only to long line paths and loops, along with the corresponding lengthening of the commutation time, but also to different line lengths for the circuit parts for different polarities of the applied voltage, which in turn leads to unequal conditions and behavior for the different polarities during a switching-off process. By means of the present measures, the current paths within the low-voltage circuit breaker device 1 which are relevant to the commutation, may be reduced, whereby the commutation time of the short-circuit current to the semiconductor circuit arrangement 11 can be reduced directly, wherein identical conditions for different polarities may additionally be created. A rapid disconnection of a short circuit may thereby be achieved, wherein the respective low-voltage circuit breaker device 1 may be executed with smaller dimensions than in the prior art. Furthermore, no compensation currents occur within the low-voltage circuit breaker device 1 due to asymmetrical states.

The present circuit breaker device 1 as well as the circuit breaker device of WO 2015/028634 A1 are low-voltage circuit breaker devices 1. Low voltage refers, as is customary per se, to the range up to 1000 V AC voltage or 1500 V DC voltage.

FIG. 1 shows a circuit breaker device with a circuit diagram in accordance with the prior art, as described, for example, in WO 2015/028634 A1, which circuit diagram also substantially corresponds to the present low-voltage circuit breaker device 1 according to a first embodiment. This has an outer conductor path 2 and a neutral conductor path 5. The outer conductor path 2 proceeds through the circuit breaker device 1 from a first conductor supply connection 3 to a second conductor load connection 4. The neutral conductor path 5 proceeds through the circuit breaker device 1 from a neutral conductor terminal 6 to a neutral conductor terminal 7. The respective terminals 3, 4, 6, 7 are each preferably designed as screw connection terminals or plug-in connection terminals, and are arranged in the circuit breaker device 1 accessible from outside.

The circuit breaker device 1 preferably has an insulating-material housing.

A mechanical bypass switch 8 is arranged in the outer conductor path 2. Preferably, and as illustrated, a first mechanical disconnect switch 9, in particular in series with the bypass switch 8, is also arranged in the outer conductor path 2. A second mechanical disconnect switch 10 is preferably arranged in the neutral conductor path 5. A semiconductor circuit arrangement 11 is connected in parallel to the bypass switch 8.

In the case of a present low-voltage circuit breaker device 1, it is preferably provided that the bypass switch 8 be designed as a switch with multiple breaks.

Furthermore, a surge arrester 19 is connected in parallel to the bypass switch 8.

The circuit breaker device 1 further comprises a current measuring arrangement 12, which is arranged in the outer conductor path 2 and which preferably comprises a shunt resistor.

The current measuring arrangement 12 is connected to an electronic control unit 13 of the circuit breaker device 1, which preferably comprises a microcontroller or microprocessor. The electronic control unit 13 is designed to actuate the bypass switch 8 and the first semiconductor circuit arrangement 11 as well as, preferably, the first mechanical disconnect switch 9 and the second mechanical disconnect switch 10, and therefore to actuate or switch them in a predefined manner. For this purpose, the electronic control unit 13 is preferably connected by circuitry to the first semiconductor circuit arrangement 11 as well as, in particular, also to electromagnetic actuating elements of the mechanical switches, therefore of the bypass switch 8, of the first mechanical disconnect switch 9 and of the second mechanical disconnect switch 10. The corresponding connections originating from the electronic control unit 13 are not shown in FIG. 1.

The first semiconductor circuit arrangement 11 preferably has a rectifier circuit 20, which preferably is formed as full bridge, as well as, in the present embodiment, two power semiconductors 21, which here are implemented as IGBT, as actual switching or control elements.

In addition to the actual circuit breaker device 1, FIG. 1 further indicates the electrical environment. In this case, the supply network is represented by the AC/DC mains voltage source 16, the mains internal resistance 17 and the mains inductance 18. Furthermore, an electrical load 23 and an electrical fault 22 in the form of a short circuit are shown.

In the case of a switching device according to FIG. 1, it is provided that a breaking process is carried out by the bypass switch 8 and the first semiconductor circuit arrangement 11, and the first and second disconnect switches 9, 10 merely serve to ensure galvanic separation of the load circuit after disconnection has taken place.

In a present low-voltage circuit breaker device 1, it is provided that the at least one first semiconductor component 63, preferably the first semiconductor component assembly 65, is arranged on a first side 61 of a component carrier 60 and that the at least one second semiconductor component 64, preferably the second semiconductor component assembly 66, is arranged on a second side 62 of the component carrier 60 facing away from the first side 61.

The at least one first and second semiconductor component 63, 64 or the first and second semiconductor component assembly 65, 66 is preferably power transistors, in particular IGBTs 21, as well as diodes 74, as shown in FIGS. 1 and 2. Particularly preferably and as shown in FIG. 2, the power transistors are embodied as back-to-back IGBTs.

The present invention relates to the arrangement of the actual components in an actual low-voltage circuit breaker device 1. Although they may be implemented with a plurality of different technologies of the relevant semiconductor components 63, 64 as well as the circuit in which they are switched or wired or connected, the circuit arrangement in FIG. 2 is particularly preferred since this enables a structure in question through the component carrier without feedthrough.

It may be provided that, in addition to the semiconductor components 63, 64, further electrotechnical components or elements are arranged on the component carrier 60.

The component carrier 60 substantially fulfills the tasks which a printed circuit board or PCB also assumes. Component carrier 60 is preferably formed as a substrate, in particular as a ceramic substrate, preferably comprising $Al_2O_3$ or AlN.

It is preferably provided that the at least one first semiconductor component 63 and/or the at least one second semiconductor component 64, in particular the first semiconductor component assembly 65 and/or the second semiconductor component assembly 66, is each arranged as bare die 73 on the component carrier 60, in particular the ceramic substrate. Bare die 73 denotes, in a manner known per se, a semiconductor component 63 64 without a housing. FIG. 3 shows a corresponding arrangement in a sectional representation, the connection of the individual bare die being made by means of bondings 75.

The component carrier 60 may be formed in one piece or in multiple parts. FIG. 2 shows a one-piece component carrier 60, both sides of the component carrier 60 being illustrated. Shown to the left of the circuit diagram is the first side 61 of a component carrier 60; shown to the right of the circuit diagram is the second side 62 of component carrier 60.

FIG. 3 shows an alternative embodiment of a component carrier 60. The component carrier 60 has thereby a first component carrier plate 67 and a second component carrier plate 68, wherein a larger number of component carrier plates may also be provided which together form the component carrier 60, in particular three, four, five or six component carrier plates. The first side 61 of the component carrier 60 is arranged on the first component carrier plate 67 and the second 62 side of the component carrier 60 is arranged on the second component carrier plate 68. Involved are two component carrier plates 67, 68 which are physically separate per se and which together form the component carrier 60.

Preferably, and as shown in FIG. 3, it is provided that the first component carrier plate 67 is arranged parallel to the second component carrier plate 68, in particular contiguous thereto. The two component carrier plates 67, 68 are arranged in the manner of a sandwich construction. This has advantages in the manufacture of the assembly in question.

At least one first terminal 71 of the semiconductor circuit arrangement 11 and a second terminal 72 of the semiconductor circuit arrangement 11 are arranged on the component carrier 60. The two terminals are arranged in particular at edge regions of the component carrier 60.

It is particularly preferably provided that the at least one first semiconductor component (63), preferably the first semiconductor component assembly (65), is provided for a first voltage polarity or is arranged in the circuit at a corresponding point, and that the at least one second semiconductor component (64), preferably the second semiconductor component assembly (66), is provided for a second voltage polarity or is arranged in the circuit at a corresponding point.

In this context, it is therefore provided that arranged on the first side 61 of the component carrier 60 is the part of the semiconductor circuit arrangement 11 which is provided or embodied for the first polarity, for instance "positive", of an applied voltage, and that arranged on the second side 62 of the component carrier 60 is the part of the semiconductor circuit arrangement 11 which is provided or embodied for the second polarity, for instance "negatively", of an applied voltage.

The semiconductor circuit arrangement 11 has a first current path 69 on the first side 61 of the component carrier 60 and a second current path 70 on the second side 62 of the component carrier 60. The first current path 69 preferably proceeds thereby from the first terminal 71 to the second terminal 72 through the at least one first semiconductor component 63, preferably the first semiconductor component assembly 65. The second current path 70 preferably proceeds from the first terminal 71 to the second terminal 72 through the at least one second semiconductor component 64, preferably the second semiconductor component assembly 66. The respective semiconductor components 63 64 are thus also part of the respective current path 69, 70 and correspondingly also to be taken into account for the following details relating to the embodiment of the current paths 69, 70, in particular with regard to the length, shape and inductance.

It is preferably provided that the first current path 69 and the second current path 70 have substantially the same shape and/or length. This makes it possible to achieve an approximate or as identical a behavior as possible per polarity.

It is particularly preferred that the first current path 69 and the second current path 70 have substantially the same loop inductance. In this case, the two current paths 69, 70 may also be configured differently with regard to dimensions as long as the inductance, in particular the inductive resistance, is substantially the same.

In summary, it is preferably provided that the first current path 69 and the second current path 70 are designed substantially identically or mirror-symmetrically.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A low-voltage circuit breaker device, comprising:
   at least one outer conductor path from an outer conductor supply terminal of the low-voltage circuit breaker device to an outer conductor load terminal of the low-voltage circuit breaker device;
   a neutral conductor path from a neutral conductor terminal of the low-voltage circuit breaker device to a neutral conductor load terminal of the low-voltage circuit breaker device;
   a mechanical by-pass switch arranged in the outer conductor path;
   a semiconductor circuit arrangement of the low-voltage circuit breaker device connected in parallel to the bypass switch;
   an electronic control unit; and
   a current measurement arrangement arranged in the outer conductor path and connected to the electronic control unit,
   wherein the electronic control unit is configured to actuate the mechanical by-pass switch and the semiconductor circuit arrangement upon detection of a predefined overload current, comprising a short-circuit current, by the current measurement arrangement,
   wherein the semiconductor circuit arrangement comprises at least one first semiconductor component and at least one second semiconductor component, and
   wherein the at least one first semiconductor component is arranged on a first side of a component carrier, and the at least one second semiconductor component is arranged on a second side of the component carrier facing away from the first side.

2. The low-voltage circuit breaker device according to claim 1, wherein the component carrier comprises a one-piece ceramic substrate.

3. The low-voltage circuit breaker device according to claim 1, wherein the component carrier has at least one first component carrier plate and one second component carrier plate,
   wherein the first side of the component carrier is arranged on the first component carrier plate, and
   wherein the second side of the component carrier is arranged on the second component carrier plate.

4. The low-voltage circuit breaker device according to claim 3, wherein the first component carrier plate is arranged in parallel to the second component carrier plate so as to be contiguous thereto.

5. The low-voltage circuit breaker device according to claim 3, wherein the first component carrier plate and the second component carrier plate comprise ceramic substrate.

6. The low-voltage circuit breaker device according to claim 1, wherein the first semiconductor component and the second semiconductor component are each an assembly that comprises at least one power transistor comprising an IGBT and a diode.

7. The low-voltage circuit breaker device according to claim 1, wherein the semiconductor circuit arrangement comprises a first current path on the first side of the component carrier,
   wherein the semiconductor circuit arrangement has a second current path on the second side of the component carrier, and
   wherein the first current path and the second current path have substantially a same shape and/or length.

8. The low-voltage circuit breaker device according to claim 1, wherein the semiconductor circuit arrangement comprises a first current path on the first side of the component carrier,
   wherein the semiconductor circuit arrangement has a second current path on the second side of the component carrier, and
   wherein the first current path and the second current path have substantially a same loop inductance.

9. The low-voltage circuit breaker device according to claim 8, wherein the first current path and the second current path are configured substantially identically.

10. The low-voltage circuit breaker device according to claim 1, wherein the semiconductor circuit arrangement has a first connection on the component carrier and a second connection on the component carrier.

11. The low-voltage circuit breaker device according claim 8, wherein the semiconductor circuit arrangement has a first connection on the component carrier and a second connection on the component carrier,
    wherein the first current path proceeds from the first terminal to the second terminal through the at least one first semiconductor component, and
    wherein the second current path proceeds from the first terminal to the second terminal through the at least one second semiconductor component.

12. The low-voltage circuit breaker device according to claim 1, wherein the at least one first semiconductor component and/or the at least one second semiconductor component are each arranged as bare die on the component carrier, which comprises a ceramic substrate.

13. The low-voltage circuit breaker device according to claim 1, wherein the at least one first semiconductor component is provided for a first voltage polarity, and
    wherein the at least one second semiconductor component is provided for a second voltage polarity.

14. The low-voltage circuit breaker device according to claim 1, wherein the at least one first semiconductor component comprises a first semiconductor component assembly.

15. The low-voltage circuit breaker device according to claim 1, wherein the at least one second semiconductor component comprises a second semiconductor component assembly.

16. The low-voltage circuit breaker device according to claim 6, wherein the IGBT comprises in each case a back to back IGBT.

17. The low-voltage circuit breaker device according to claim 11, wherein the at least one first semiconductor component comprises a first semiconductor component assembly.

18. The low-voltage circuit breaker device according to claim 11, wherein the at least one second semiconductor component comprises a second semiconductor component assembly.

19. The low-voltage circuit breaker device according to claim 12, wherein the at least one first semiconductor component comprises a first semiconductor component assembly.

20. The low-voltage circuit breaker device according to claim 12, wherein the at least one second semiconductor component comprises a second semiconductor component assembly.

* * * * *